United States Patent
Tashiro et al.

(10) Patent No.: US 10,460,618 B2
(45) Date of Patent: Oct. 29, 2019

(54) SCORING RULE APPLICATION TARGET SPECIFICATION METHOD, CORRECT/INCORRECT DETERMINATION RULE SETTING METHOD, APPLICATION TARGET SPECIFYING DEVICE, CORRECT/INCORRECT DETERMINATION RULE SETTING DEVICE, AND COMPUTER-READABLE RECORDING MEDIUM

(71) Applicant: FUJITSU LIMITED, Kawasaki-shi, Kanagawa (JP)

(72) Inventors: Shinichi Tashiro, Narashino (JP); Masanori Isobe, Ota (JP); Shintaro Kida, Kawasaki (JP); Aiko Koyago, Ota (JP)

(73) Assignee: FUJITSU LIMITED, Kawasaki (JP)

( * ) Notice: Subject to any disclaimer, the term of this patent is extended or adjusted under 35 U.S.C. 154(b) by 237 days.

(21) Appl. No.: 15/151,140

(22) Filed: May 10, 2016

(65) Prior Publication Data
US 2016/0335904 A1 Nov. 17, 2016

(30) Foreign Application Priority Data
May 11, 2015 (JP) ................................. 2015-096503

(51) Int. Cl.
*G09B 7/00* (2006.01)
*G09B 7/02* (2006.01)
(Continued)

(52) U.S. Cl.
CPC ............. *G09B 7/00* (2013.01); *G06K 9/6201* (2013.01); *G09B 7/02* (2013.01); *G09B 7/06* (2013.01)

(58) Field of Classification Search
CPC ................................ G09B 7/00; G06K 9/6201
See application file for complete search history.

(56) References Cited

U.S. PATENT DOCUMENTS 3,868,782 A * 3/1975 Burchette ................ G09B 3/08
434/353
5,102,341 A * 4/1992 Koslin ..................... G09B 3/08
341/5
(Continued)

FOREIGN PATENT DOCUMENTS

| JP | 3-164885 A | 7/1991 |
| JP | 6-266278 A | 9/1994 |

(Continued)

OTHER PUBLICATIONS

Office Action dated May 14, 2019, issued in counterpart JP Application No. 2015-096503, with English translation. (5 pages).
(Continued)

*Primary Examiner* — Milap Shah
(74) *Attorney, Agent, or Firm* — Westerman, Hattori, Daniels & Adrian, LLP

(57) ABSTRACT

A non-transitory computer-readable recording medium stores a scoring rule application target specification program that causes a computer to execute a process including: receiving specification of one or more areas in an image; and storing the one or more areas in a storage in a manner associated with a question number in order of being received.

9 Claims, 15 Drawing Sheets

(51) Int. Cl.
*G09B 7/06* (2006.01)
*G06K 9/62* (2006.01)

(56) References Cited

U.S. PATENT DOCUMENTS

| | | | | |
|---|---|---|---|---|
| 5,229,589 A * | 7/1993 | Schneider | G06K 7/1443 | 235/456 |
| 5,597,311 A | 1/1997 | Yanagida et al. | | |
| 5,672,060 A * | 9/1997 | Poor | G09B 7/02 | 382/321 |
| 5,775,918 A * | 7/1998 | Yanagida | G09B 3/04 | 434/353 |
| 6,042,384 A * | 3/2000 | Loiacono | G09B 3/02 | 434/322 |
| 6,173,154 B1 * | 1/2001 | Kucinski | G06K 17/0032 | 434/322 |
| 6,366,760 B1 * | 4/2002 | Kucinski | G06K 17/0032 | 382/312 |
| 6,684,052 B2 * | 1/2004 | Kucinski | G06K 17/0032 | 382/311 |
| 7,604,161 B2 * | 10/2009 | Tamune | G09B 1/00 | 235/375 |
| 7,764,923 B2 * | 7/2010 | Saito | G09B 7/02 | 434/353 |
| 8,280,300 B2 * | 10/2012 | Slijp | G06K 17/0032 | 434/353 |
| 9,099,007 B1 * | 8/2015 | Abumov | G06F 17/21 | |
| 2003/0224340 A1 * | 12/2003 | Housman | G06K 17/0032 | 434/353 |
| 2005/0255439 A1 * | 11/2005 | Cody | G09B 7/06 | 434/353 |
| 2006/0160054 A1 * | 7/2006 | Onishi | G09B 7/02 | 434/322 |
| 2006/0194189 A1 * | 8/2006 | Koyama | G09B 7/00 | 434/362 |
| 2006/0252023 A1 * | 11/2006 | Cui | G09B 7/06 | 434/353 |
| 2006/0257841 A1 * | 11/2006 | Mangano | G09B 3/00 | 434/354 |
| 2007/0031802 A1 * | 2/2007 | Koyama | G09B 7/02 | 434/323 |
| 2008/0311551 A1 * | 12/2008 | Reed | G06K 9/2063 | 434/356 |
| 2014/0065594 A1 * | 3/2014 | Venable | G09B 7/00 | 434/353 |
| 2015/0064683 A1 * | 3/2015 | Rajagopalan | G09B 7/06 | 434/359 |

FOREIGN PATENT DOCUMENTS

| | | |
|---|---|---|
| JP | 1-234630 A | 9/1995 |
| JP | 2007-41177 A | 2/2007 |
| JP | 2007-48217 A | 2/2007 |
| JP | 2010-101970 A | 5/2010 |
| JP | 2013-11705 A | 1/2013 |
| JP | 2014-59663 A | 4/2014 |

OTHER PUBLICATIONS

"Japanese in the sixth grade of elementary school: How to put commas", Jan. 5, 2014, https://www.drills-app.com, posts/330; cited in JP Office Action; with partial English translation. (2 pages).

Office Action dated Jan. 22, 2019, issued in counterpart JP Application No. 2015-096503, with English machine translation. (7 pages).

* cited by examiner

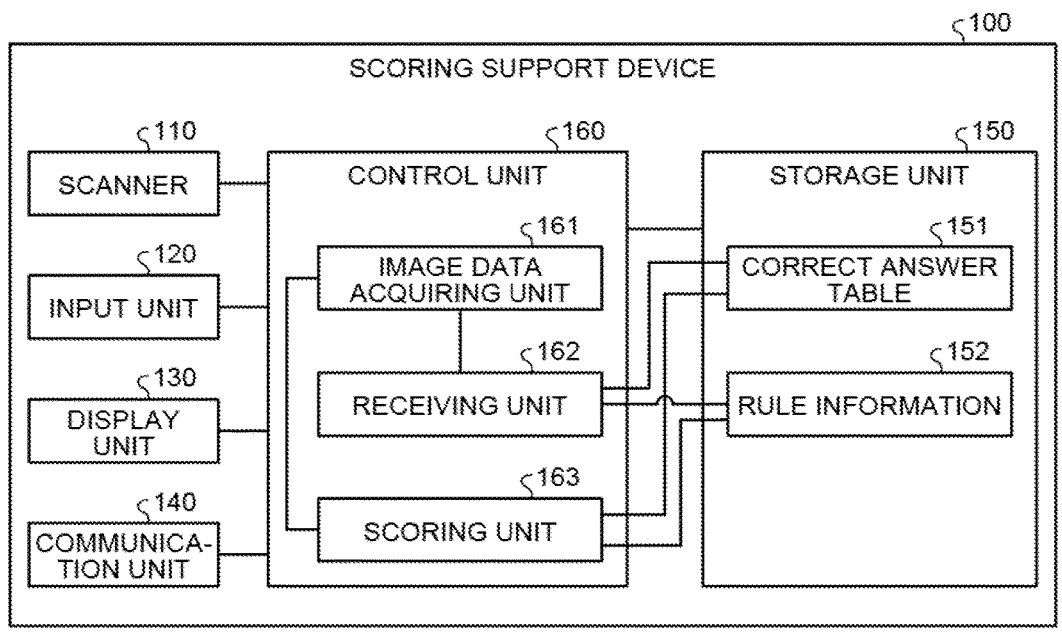

FIG.3

INSERT PUNCTUATION MARKS IN SUITABLE POSITIONS
IN THE FOLLOWING SENTENCES

QUESTION 1

I LIKE BEAUTIFUL CHERRY BLOSSOMS

QUESTION 2

THE GIRL WEARING RED CLOTHES IS MY SISTER

FIG.4

INSERT PUNCTUATION MARKS IN SUITABLE POSITIONS IN THE FOLLOWING SENTENCES

20a

QUESTION 1

10a  10b                                              10c

I LIKE BEAUTIFUL CHERRY BLOSSOMS

20b

QUESTION 2

11a        11b

THE GIRL WEARING RED CLOTHES IS MY SISTER

---

INPUT THE QUESTION AREA, THE ANSWER AREA, AND THE CORRECT ANSWER CONTENTS

| 1a | 1b | 1c |
|---|---|---|
| QUESTION AREA SPECIFICATION | ANSWER AREA SPECIFICATION | CORRECT ANSWER CONTENTS |

| 1d | 1e |
|---|---|
| SHIFT TO NEXT QUESTION | END |

INSERT PUNCTUATION MARKS IN SUITABLE POSITIONS
IN THE FOLLOWING SENTENCES

QUESTION 1

I LIKE BEAUTIFUL CHERRY BLOSSOMS 50a  50b                                    50c

QUESTION 2

THE GIRL WEARING RED CLOTHES IS MY SISTER 50f              50d         50e

FIG.6

INSERT PUNCTUATION MARKS IN SUITABLE POSITIONS
IN THE FOLLOWING SENTENCES

QUESTION 1

I LIKE BEAUTIFUL CHERRY BLOSSOMS

QUESTION 2

THE GIRL WEARING RED CLOTHES IS MY SISTER

| QUESTION NUMBER | QUESTION AREA | CORRECT ANSWER AREA |
|---|---|---|
| T201 | (x21, y21), (x22, y22) | (x23, y23), (x24, y24) |
| T202 | (x25, y25), (x26, y26) | (x27, y27), (x28, y28) |
| ... | | |

FIG.11

SELECT CORRECT ANSWERS FOR THE FOLLOWING QUESTIONS

QUESTION 1

WHICH IS THE CORRECT WEATHER CONDITIONS FOR AN "ICE DAY"

1. A DAY WHEN THE MINIMUM TEMPERATURE DROPS BELOW 0 DEGREES CELSIUS
2. A DAY WHEN THE MINIMUM TEMPERATURE DROPS BELOW -3 DEGREES CELSIUS
3. A DAY WHEN THE MAXIMUM TEMPERATURE DROPS BELOW 0 DEGREES CELSIUS

QUESTION 2

WHAT IS THE OFFICIAL NAME OF "USB" USED FOR PERSONAL COMPUTERS?

1. UNIT SERIAL BUS
2. UNIT SEATTLE BUS
3. UNION SINGLE BUS
4. UNIVERSAL SERIAL BUS

FIG.12

SELECT CORRECT ANSWERS FOR THE FOLLOWING QUESTIONS

QUESTION 1

WHICH IS THE CORRECT WEATHER CONDITIONS FOR AN "ICE DAY"

1. A DAY WHEN THE MINIMUM TEMPERATURE DROPS BELOW 0 DEGREES CELSIUS
2. A DAY WHEN THE MINIMUM TEMPERATURE DROPS BELOW -3 DEGREES CELSIUS
3. A DAY WHEN THE MAXIMUM TEMPERATURE DROPS BELOW 0 DEGREES CELSIUS

QUESTION 2

WHAT IS THE OFFICIAL NAME OF "USB" USED FOR PERSONAL COMPUTERS?

1. UNIT SERIAL BUS
2. UNIT SEATTLE BUS
3. UNION SINGLE BUS
4. UNIVERSAL SERIAL BUS

INPUT THE QUESTION AREA AND THE CORRECT ANSWER AREA

| QUESTION AREA SPECIFICATION | CORRECT ANSWER AREA SPECIFICATION |
| SHIFT TO NEXT QUESTION | END |

SELECT CORRECT ANSWERS FOR THE FOLLOWING QUESTIONS

QUESTION 1
WHICH IS THE CORRECT WEATHER CONDITIONS FOR AN "ICE DAY"

1. A DAY WHEN THE MINIMUM TEMPERATURE DROPS BELOW 0 DEGREES CELSIUS
2. A DAY WHEN THE MINIMUM TEMPERATURE DROPS BELOW -3 DEGREES CELSIUS
(3.) A DAY WHEN THE MAXIMUM TEMPERATURE DROPS BELOW 0 DEGREES CELSIUS

90a

QUESTION 2
WHAT IS THE OFFICIAL NAME OF "USB" USED FOR PERSONAL COMPUTERS?

1. UNIT SERIAL BUS
90b — (2.) UNIT SEATTLE BUS
3. UNION SINGLE BUS
4. UNIVERSAL SERIAL BUS

FIG.14

SELECT CORRECT ANSWERS FOR THE FOLLOWING QUESTIONS

90

80a

QUESTION 1

WHICH IS THE CORRECT WEATHER CONDITIONS FOR AN "ICE DAY"

1. A DAY WHEN THE MINIMUM TEMPERATURE DROPS BELOW 0 DEGREE CELSIUS
2. A DAY WHEN THE MINIMUM TEMPERATURE DROPS BELOW -3 DEGREES CELSIUS
3. A DAY WHEN THE MAXIMUM TEMPERATURE DROPS BELOW 0 DEGREE CELSIUS 70a  90a

80b

QUESTION 2

WHAT IS THE OFFICIAL NAME OF "USB" USED FOR PERSONAL COMPUTERS?

1. UNIT SERIAL BUS
90b — 2. UNIT SEATTLE BUS
3. UNION SINGLE BUS
70b — 4. UNIVERSAL SERIAL BUS

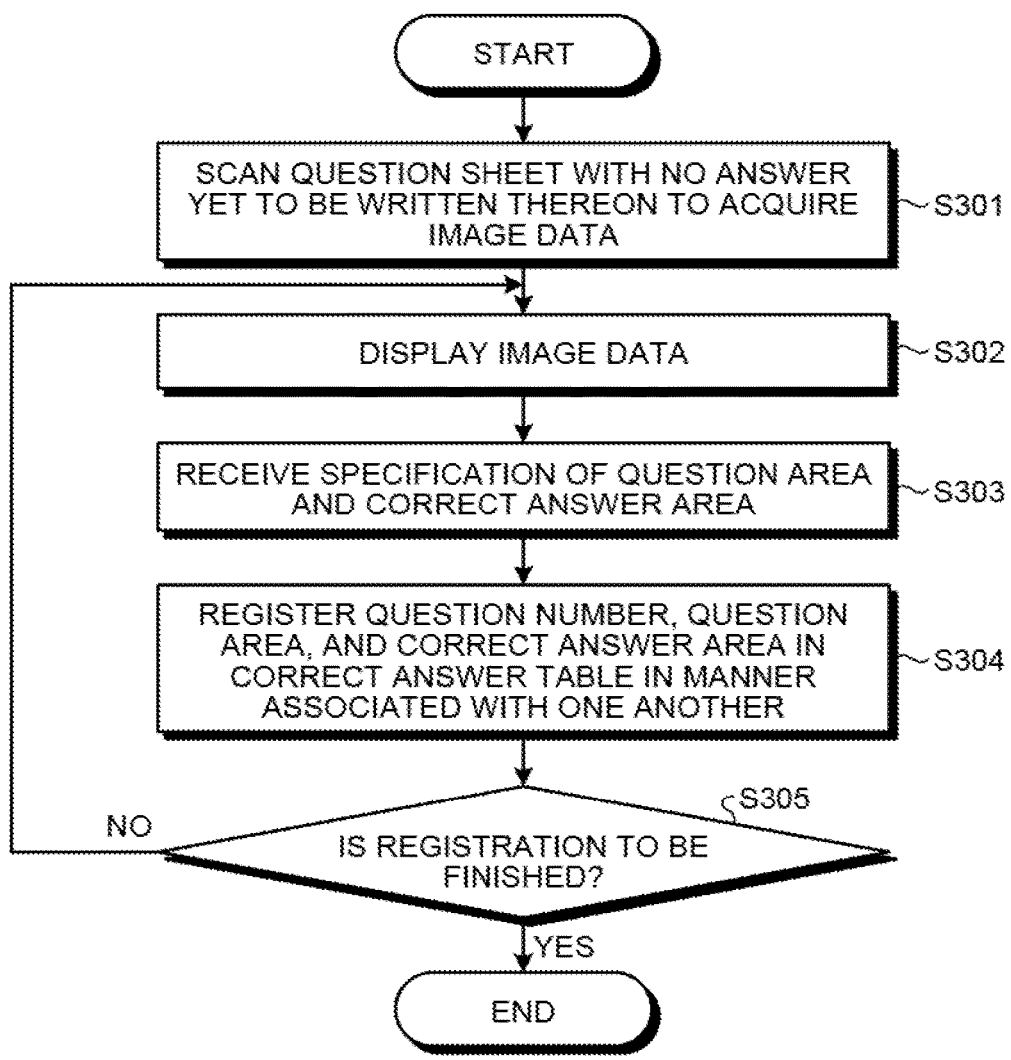

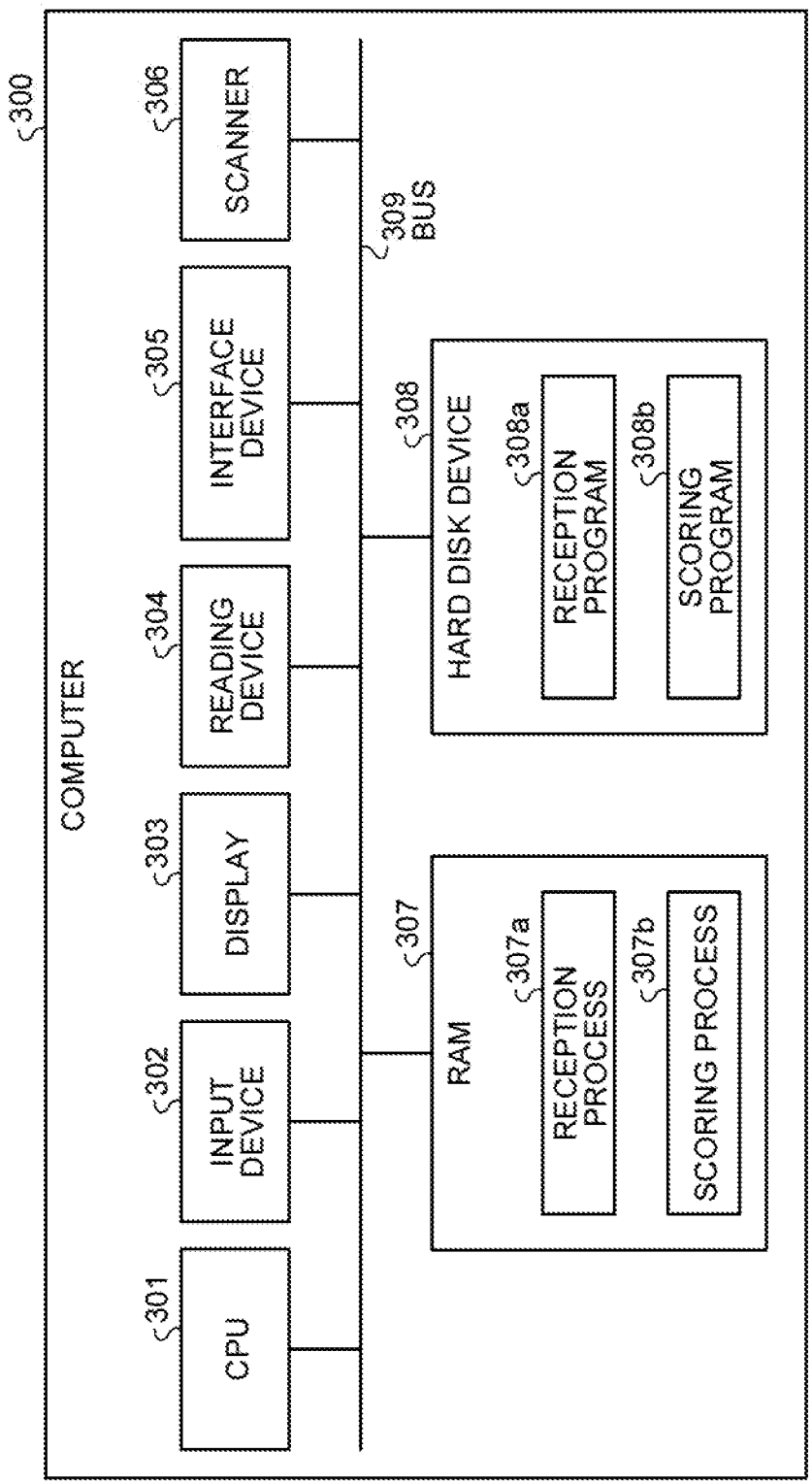

US 10,460,618 B2

SCORING RULE APPLICATION TARGET SPECIFICATION METHOD, CORRECT/INCORRECT DETERMINATION RULE SETTING METHOD, APPLICATION TARGET SPECIFYING DEVICE, CORRECT/INCORRECT DETERMINATION RULE SETTING DEVICE, AND COMPUTER-READABLE RECORDING MEDIUM

CROSS-REFERENCE TO RELATED APPLICATION

This application is based upon and claims the benefit of priority of the prior Japanese Patent Application No. 2015-096503, filed on May 11, 2015, the entire contents of which are incorporated herein by reference.

FIELD

The embodiments discussed herein are related to a scoring rule application target specification method and the like.

BACKGROUND

In related scoring (for example, Japanese Laid-open Patent Publication No. 2010-101970, Japanese Laid-open Patent Publication No. 06-266278, Japanese Laid-open Patent Publication No. 03-164885, Japanese Laid-open Patent Publication No. 2007-48217), a teacher collects question sheets on which students write answers and checks whether the students write correct answers for respective questions on the question sheets, thereby performing scoring for each of the students. In this method, an increase in the number of students or the number of questions increases a burden on the teacher. To address this, technologies for automatic scoring has been developed. To enable a teacher to smoothly perform scoring work, for example, widely used are scoring systems that read marks using optical answer sheets or the like instead of print answer sheets.

The related technologies described above, however, fail to support creation of questions designed for electronic terminals from a print medium, scoring of the questions, and management of scores.

The scoring systems according to the related technologies using optical answer sheets fail to perform examination with a print medium used by a teacher or the like. Furthermore, the questions are limited to multiple-choice questions, whereby the scoring systems fail to perform examination that meets the teacher's demand. The use of the optical answer sheets, for example, leads students to certain answers to some extent, making it difficult to evaluate scholastic abilities of the students.

SUMMARY

According to an aspect of the embodiments, a non-tranistory computer-readable recording medium stores a scoring rule application target specification program that causes a computer to execute a process including: receiving specification of one or more areas in an image; and storing the one or more areas in a storage unit in a manner associated with a question number in order of being received.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a functional block diagram of a configuration of a scoring support device according to a first embodiment of the present invention;

FIG. 2 is an example diagram of a data structure of a correct answer table according to the first embodiment;

FIG. 3 is an example diagram of image data with no answer having been input thereto;

FIG. 4 is a diagram for explaining processing performed by a receiving unit according to the first embodiment;

FIG. 5 is an example diagram of image data with answers input thereto;

FIG. 6 is a diagram for explaining processing performed by a scoring unit according to the first embodiment;

FIG. 11 is an example diagram of image data with no answer for multiple-choice questions having been input thereto;

FIG. 12 is a diagram for explaining processing performed by the receiving unit according to the second embodiment;

FIG. 13 is an example diagram of image data with answers for the multiple-choice questions input thereto;

FIG. 14 is a diagram for explaining processing performed by the scoring unit according to the second embodiment;

FIG. 15 is a flowchart of a process of registration according to the second embodiment;

FIG. 17 is an example diagram of a computer that executes an application target specification program or a correct/incorrect determination rule setting program.

DESCRIPTION OF EMBODIMENTS

Figure 7:
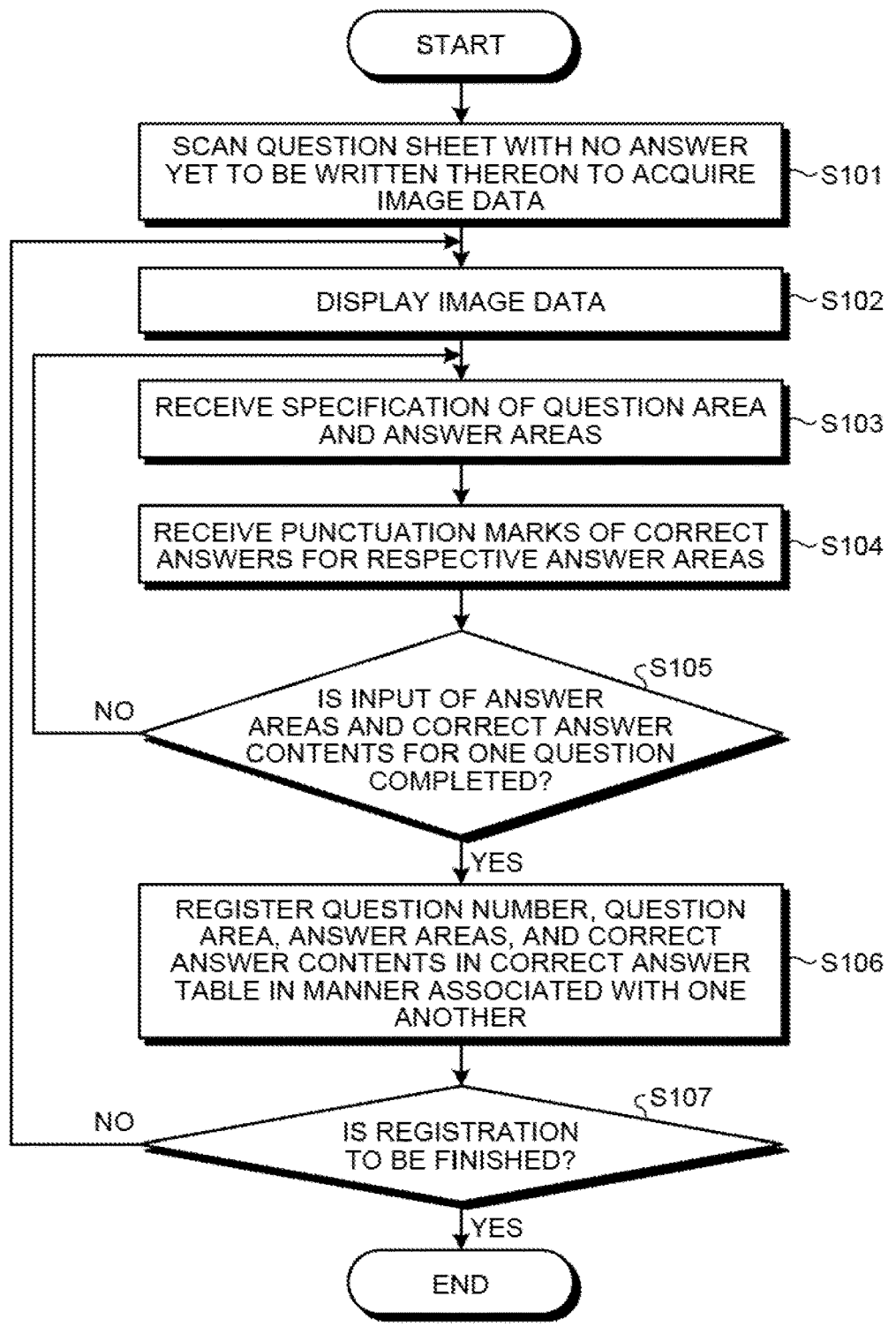
FIG. 7 is a flowchart of a process of registration according to the first embodiment.

Preferred embodiments will be explained with reference to accompanying drawings. The embodiments are not intended to limit the present invention.

[a] First Embodiment

FIG. 1 is a functional block diagram of a configuration of a scoring support device according to a first embodiment of the present invention. As illustrated in FIG. 1, a scoring support device 100 includes a scanner 110, an input unit 120, a display unit 130, a communication unit 140, a storage unit 150, and a control unit 160. The scoring support device 100 is an example of the application target specifying device.

The scanner 110 is a device that reads a print medium on which questions are written, such as a question sheet, with an optical sensor or the like, thereby retrieving the surface of the print medium as image data. In the following description, image data retrieved from a print medium by the scanner 110 is appropriately simply referred to as image data.

The input unit 120 is an input device used by a user to input various types of information to the scoring support device 100. The input unit 120 corresponds to a keyboard, a mouse, or a touch panel, for example.

The display unit 130 is a display device that displays information output from the control unit 160. The display unit 130 corresponds to a display or a touch panel, for example.

The communication unit 140 is a communication device that performs data communications with am external device via a network. The control unit 160, which will be described later, transmits and receives data to and from the external device via the communication unit 140.

The storage unit 150 stores therein a correct answer table 151 and scoring rule information 152. The storage unit 150, for example, corresponds to a semiconductor memory device, such as a random access memory (RAM), a read only memory (ROM), and a flash memory, or a storage device, such as a hard disk drive (HDD).

FIG. 2 is an example diagram of a data structure in the correct answer table according to the first embodiment. As illustrated, in FIG. 2, the correct answer table 151 stores therein a question number, a question area, answer areas, and correct answer contents in a manner associated with one another. The question number is information for uniquely identifying a question. The question area indicates an area on the image data in which a question corresponding to the question number is present. The question area is specified by coordinates of its upper left corner and coordinates of its lower right corner, for example.

The answer area indicates an area in which the user inputs an answer for the question corresponding to the question number. The answer area is specified by coordinates of its upper left corner and coordinates of its lover right corner, for example. The correct answer contents indicate contents of a correct answer corresponding to the answer area. The correct answer contents corresponding to an answer area "(x3,y3), (x4,y4)" are a "comma". If a ", (comma)" is input to the answer area "(x3,y3), (x4,y4)" of the electronic data, it is determined that the answer area receives a correct answer.

The scoring rule information 152 defines conditions on which an answer for a question is determined to be correct. The scoring rule information 152, for example, includes the information that, if all answer areas corresponding to a question number receive the correct answer contents, and an area other than the answer areas receives no input, the answer for the question corresponding to the question number is determined to be correct. The scoring rule information 152 also defines a score given when the answer corresponding to the question number is correct.

The control unit 160 includes an image data acquiring unit 161, a receiving unit 162, and a scoring unit 163. The control unit 160 corresponds to an integrated device, such as an application specific integrated circuit (ASIC) and a field programmable gate array (FPGA). The control unit 160, for example, corresponds to an electronic circuit, such as a central processing unit (CPU) and a micro processing unit (MPU).

The image data acquiring unit 161 is a processing unit that acquires image data from the scanner 110. The image data acquiring unit 161 outputs the image data to the receiving unit 162 or the scoring unit 163. If the image data acquiring unit 161 acquires image data of a question sheet with no answer having been input thereto, for example, the image data acquiring unit 161 outputs it to the receiving unit 162. If the image data acquiring unit 161 acquires image data of a question sheet with answers input thereto, the image data acquiring unit 161 outputs it to the scoring unit 163. The image data acquiring unit 161 may be notified of whether the image data is data with no answer having been input thereto or data with answers input thereto by the user operating the input unit 120.

The scoring support device 100 according to the first embodiment may read, with the scanner 110, print media on which answers are writ Ion by students to perform scoring. Alternatively, the scoring support device 100 may display image data of a question sheet on terminal devices of the respective students and cause them to input the answers to perform scoring.

The receiving unit 162 is a processing unit that receives specification of one or more answer areas in the image data and registers the one or more answer areas in the correct answer table 151 in a manner associated with a question number in order of being received. The receiving unit 162 also receives correct answer contents corresponding to the respective answer areas and registers them in the correct answer table 151. FIG. 3 is an example diagram of image data with no answer having been input thereto.

The following describes an example of processing performed by the receiving unit 162. The receiving unit 162, for example, displays image data 10 illustrated in FIG. 3 including a message such as that "specify the question area, the answer area, and the correct answer contents" on the display unit 130. The receiving unit 162 may also display a "question area specification button", an "answer area specification button", a "correct answer content button", a "shift-to-next-question button", and an "end button", for example.

FIG. 4 is a diagram for explaining processing performed by the receiving unit according to the first embodiment. The user, such as a teacher, operates the input unit 120 to specify a question area 20a and press a question area specification button 1a, for example. The receiving unit 162 generates a unique question number and registers the coordinates of the question area 20a in the correct answer table 151 in a manner associated with the generated question number.

After pressing the question area specification button 1a, the user operates the input unit 120 to specify answer areas 10a, 10b, and 10c and press an answer area specification button 1b. The receiving unit 162 registers the coordinates of the answer areas 10a to 10c in the correct answer table 151 in a manner associated with the corresponding question number. Because the answer areas 10a to 10c are included in the question area 20a, for example, the receiving unit 162 registers the coordinates of the answer areas 10a to 10c in the correct answer table 151 in a manner associated with the question number of the question area 20a.

After pressing the answer area specification button 1b, the user operates the input unit 120 to input punctuation marks or the like serving as the correct answer contents to the answer areas 10a to 10c and presses a correct answer content button 1c. The receiving unit 162 performs a character analysis on the answer areas 10a to 10c, thereby identifying the correct answer contents. The receiving unit 162 then registers the answer areas and the correct answer contents in the correct answer table 151 in a manner associated with each other.

If a ", (comma)" is input to the answer area 10a as illustrated in FIG. 4, for example, the receiving unit 162 registers the answer area 10a and the correct answer contents "coma" in the correct answer table 151 in a manner associated with each other. If a ", (comma)" is input to the answer area 10b, the receiving unit 162 registers the answer area 10b and the correct answer contents "comma" in the correct answer table 151 in a manner associated with each other. If a ". (period)" is input to the answer area 10c, the receiving unit 162 registers the answer area 10c and the correct answer contents "period" in the correct answer table 151 in a manner associated with each other.

After completing specification of the question area, the answer areas, and the correct answer contents for a certain question, the user presses a shift-to-next-question button 1d. The user thus starts specification of a question area, answer areas, and correct answer contents for the next question.

Subsequently, the user specifies a question area 20b and presses the question area specification button 1a. The receiving unit 162 generates a unique question number and registers the coordinates of the question area 20b in the correct answer table 151 in a manner associated with the generated question number.

After pressing the question area specification button 1a, the user operates the input unit 120 to specify answer areas 11a and 11b and press the answer area specification button 1b. The receiving unit 162 registers the coordinates of the answer areas 11a and 11b in the correct answer table 151 in a manner associated with the corresponding question number. Because the answer areas 11a and 11b are included in the question area 20b, for example, the receiving unit 162 registers the coordinates of the answer areas 11a and 11b in the correct answer table 151 in a manner associated with the question number of the question area 20b.

After pressing the answer area specification button 1b, the user operates the input unit 120 to input punctuation marks or the like serving as the correct answer contents to the answer areas 11a and 11b and presses the correct answer content button 1c. The receiving unit 162 performs a character analysis on the answer areas 11a and 11b, thereby identifying the correct answer contents. The receiving unit 162 then registers the answer areas and the correct answer contents in the correct answer table 151 in a manner associated with each other.

After completing specification of the question area, the answer areas, and the correct answer contents for a certain question, the user presses the shift-to-next-question button 1d. The user thus starts specification of a question area, answer areas, and correct answer contents for the next question. By contrast, if the processing described above is completed for all the questions in the image data 10, the user presses an end button 1e. When the end button 1e is pressed, the receiving unit 162 finishes the processing for registering information in the correct answer table 151.

If the receiving unit 162 receives the rule information 152 via the input unit 120 or the communication unit 140, the receiving unit 162 registers the received rule information 152 in the storage unit 150. The user may operate the input unit 120, thereby appropriately updating the rule information 152.

Referring back to FIG. 1, the scoring unit 163 is a processing unit that performs scoring based on the correct answer table 151 and the rule information 152 when receiving image data with answers input thereto. The scoring unit 163, for example, selects a question number in the correct answer table 151 and specifies answer areas corresponding to the selected question number. If the answer areas in the question area corresponding to the question number receive correct answer contents, and an area other than the answer areas receives no input, the scoring unit 163 gives a score for the corresponding question based on the rule information 152.

FIG. 5 is an example diagram of image data with answers input thereto. In the example illustrated in image data 50, punctuation marks 50a, 50b, 50c, 50d, 50e, and 50f are input, for example. A student may input the punctuation marks 50a to 50f by writing them on a print medium and causing the scanner 110 to read them or by inputting them, with an input device, to a terminal device that displays the image data of the question sheet.

The processing performed by the scoring unit 163 will be described. FIG. 6 is a diagram for explaining the processing performed by the scoring unit according to the first embodiment. The following describes a case where the scoring unit 163 scores answers for a question of a question number "T101". Let us assume a case where the answer areas specified by the correct answer table 151 are the answer areas 10a to 10c. The scoring unit 163 compares the answer areas 10a to 10c with the image data 50. The scoring unit 163 performs a character analysis on characters included in the answer areas 10a to 10c in the image data 50, thereby identifying input characters (punctuation marks).

The scoring unit 163 determines whether the identified characters (punctuation marks) are identical with the respective correct answer contents corresponding to the answer areas 10a to 10c individually. Let us assume a case where the question number selected by the scoring unit 163 is "T101", for example, and the coordinates of the answer areas 10a to 10c are "(x3,y3), (x4,y4)", "(x5,y5), (x6,y6)", and "(x7,y7), (x8,y8)", respectively. Let us also assume a case where a ", (comma)" is input to the answer area 10a in the image data 50, a ", (comma)" is input to the answer area 10b, and a ". (period)" is input to the answer area 10c. In this case, the correct answer contents of the respective answer areas in the correct answer table 151 are identical with the punctuation marks input to the respective answer areas 10a to 10c in FIG. 5. The scoring unit 163 thus determines that the correct answer contents are input to the respective answer areas 10a to 10c.

After making a comparison of the answer areas 10a to 10c, the scoring unit 163 determines whether the other areas than the answer areas 10a to 10c in the question area 20a receive no input. The scoring unit 163, for example, holds the image data 10 with no answer having been input thereto. The scoring unit 163 compares the image data 10 with the image data 50 with answers input thereto, thereby determining whether the other areas than the answer areas 10a to 10c in the question area 20a receive no input. In the example illustrated in FIG. 6, the other areas than the answer areas 10a to 10c in the question area 20a receive no input.

The scoring unit 163 determines that the question area 20a corresponding to the question number satisfies the condition of the rule information 152 that the answer areas receive the respective correct answer contents and that the other areas than the answer areas receive no input. As a result, the scoring unit 163 gives a score for the question corresponding to the question number "T101". The score for the question corresponding to the question number has been registered in the rule information 152, for example.

The following describes a case where the scoring unit 163 scores answers for a question of a question number "T102". Let us assume a case where the answer areas specified by the correct answer table 151 are the answer areas 11a and 11b. The scoring unit 163 compares the answer areas 11a and 11b with the image data 50. The scoring unit 163 performs a character analysis on characters included in the answer areas 11a and 11b in the image data 50, thereby identifying input characters (punctuation marks).

The scoring unit 163 determines whether the identified characters (punctuation marks) are identical with the respective correct answer contents corresponding to the answer areas 11a and 11b individually. Let us assume a case where the question number selected by the scoring unit 163 is "T102", for example, and the coordinates of the answer areas 11a and 11b are "(x9,y9), (x10,y10)" and "(x11, y11), (x12,y12)", respectively. Let us also assume a case where a ", (comma)" is input to the answer area 11a in the image data 50, and a ". (period)" is input to the answer area 11b. In this case, the correct answer contents of the respective answer areas in the correct answer table 151 are identical with the punctuation marks input to the respective answer areas 11a and 11b in FIG. 5. The scoring unit 163 thus determines that the correct answer contents are input to the respective answer areas 11a and 11b.

After making a comparison of the answer areas 11a and 11b, the scoring unit 163 determines whether the other areas than the answer areas 11a and 11b in the question area 20b receive no input. The scoring unit 163, for example, holds the image data 10 with no answer having been input thereto. The scoring unit 163 compares the image data 10 with the image data 50 with answers input thereto, thereby determining whether the other areas than the answer areas 11a and 11b in the question area 20b receive no input. In the example illustrated in FIG. 6, an area other than the answer areas 11a and 11b in the question area 20b receives input of the punctuation mark 50f.

The scoring unit 163 determines that the question area 20b corresponding to the question number does not satisfy the condition of the rule information 152 that the answer areas receive the respective correct answer contents and that the other areas than the answer areas receive no input. As a result, the scoring unit 163 does not give a score for the question corresponding to the question number "T102".

The scoring unit 163 performs the processing described above on the questions, thereby determining whether to give scores for the respective questions. The scoring unit 163 adds up the given scores, thereby calculating a score for the image data 50. The scoring unit 163 may display the calculated score on the display unit 130 or notify an external device of the score via the communication unit.

In a case where an answer area receives no input or where an input character is not identical with the correct answer contents, which is not illustrated in FIG. 6, the scoring unit 163 determines that the condition of the rule information 152 is not satisfied. Also in this case, the scoring unit 163 does not give a score for the question.

The following describes a process of registration for scanning a question sheet with no answer having been written thereon and registering various types of information in the correct answer table 151 performed by the scoring support device 100 according to the first embodiment. FIG. 7 is a flowchart of the process of registration according to the first embodiment. As illustrated in FIG. 7, the image data acquiring unit 161 of the scoring support device 100 scans a question sheet with no answer having been written thereon to acquire image data (Step S101).

The receiving unit 162 of the scoring support device 100 displays the image data on the display unit 130 (Step S102). The receiving unit 162 receives specification of a question area and answer areas (Step S103) and receives punctuation marks of correct answers for the respective answer areas (Step S104).

If input of the answer areas and the correct answer contents for one question is not completed yet (No at Step S105), the receiving unit 162 performs the processing at Step S103 again. By contrast, if input of the answer areas and the correct answer contents for one question is completed (Yes at Step S105), the receiving unit 162 performs processing at Step S106.

The receiving unit 162 registers a question number, the question area, the answer areas, and the correct answer contents in the correct answer table 151 in a manner associated with one another (Step S106). If the registration is not to be finished (No at Step S107), the receiving unit 162 performs the processing at Step S102 again. By contrast, if the registration is to be finished (Yes at Step S107), the receiving unit 162 finishes the processing.

Figure 8:
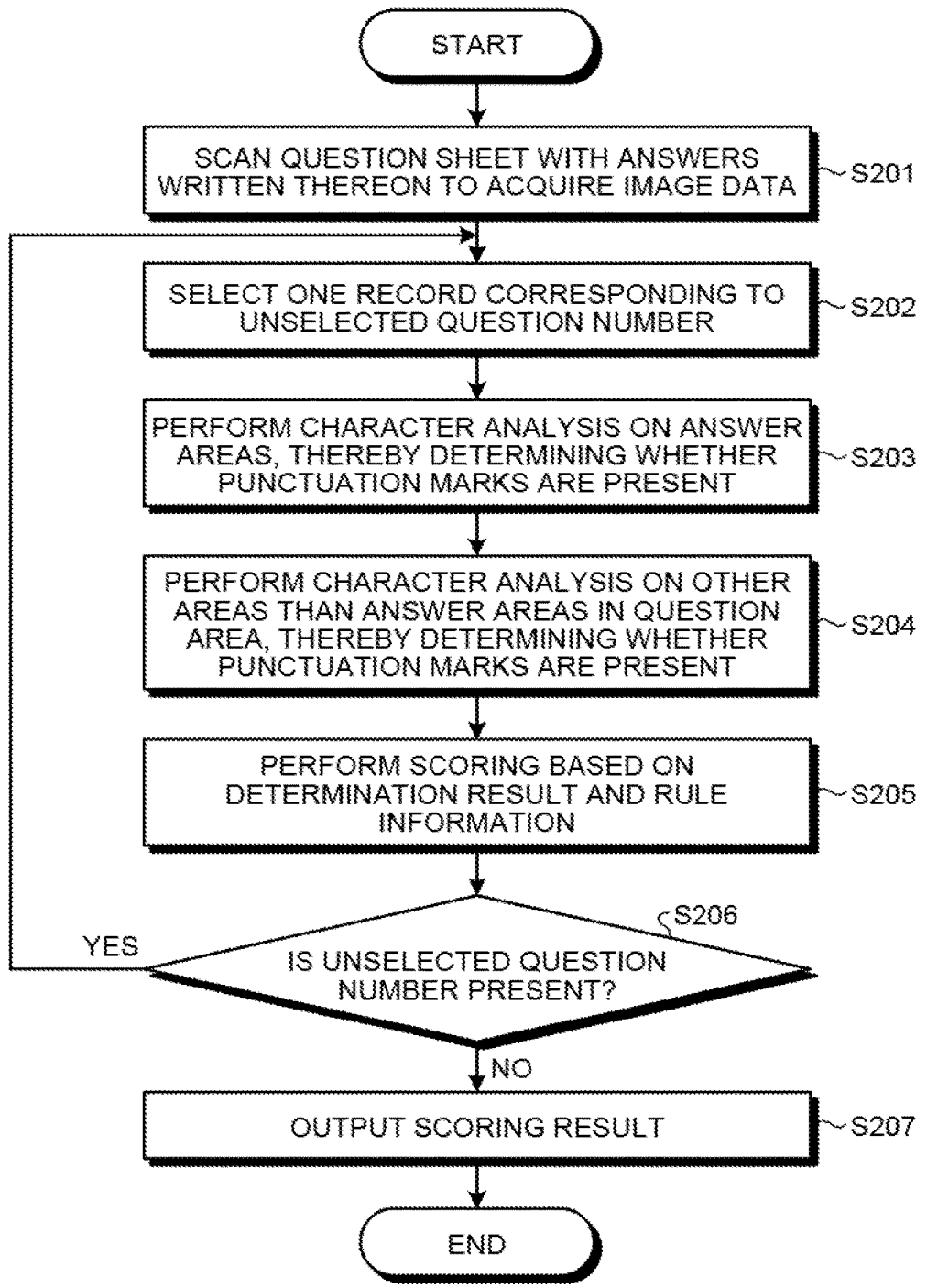
FIG. 8 is a flowchart of a process of scoring according to the first embodiment.

The following describes a process of scoring for scanning and scoring a question sheet with answers written thereon performed by the scoring support device 100 according to the first embodiment. FIG. 8 is a flowchart of a process of scoring according to the first embodiment. As illustrated in FIG. 8, the image data acquiring unit 161 of the scoring support device 100 scans a question sheet with answers written thereon to acquire image data with the answers written thereon (Step S201). The scoring support device 100 may display image data with no answer written thereon on the display unit 130 to receive input of answers to the displayed image data.

The scoring unit 163 of the scoring support device 100 refers to the correct answer table 151 to select one record corresponding to an unselected question number (Step S202). The scoring unit 163 performs a character analysis on the answer areas, thereby determining whether punctuation marks are present (Step S203). The scoring unit 163 performs a character analysis on the other areas than the answer areas in the question area, thereby determining whether punctuation marks are present (Step S204).

The scoring unit 163 performs scoring based on the result of determination at Steps S203 and S204 and the rule information 152 (Step S205). If the question area satisfies the condition of the rule information 152 that all the answer areas receive the respective correct answer contents and that the other areas than the answer areas receive no input at Step S205, for example, the scoring unit 163 gives a score.

If an unselected question number is present (Yes at Step S206), the scoring unit 163 performs the processing at Step S202 again. By contrast, if no unselected question number is present (No at Step S206), the scoring unit 163 outputs a scoring result (Step S207).

The following describes advantages effects of the scoring support device 100 according to the first embodiment. The scoring support device 100 receives specification of one or more answer areas in image data and registers the one or more answer areas in the correct answer table 151 in a manner associated with a question number in order of being received. By using the information registered in the correct answer table 151, for example, the scoring support device 100 can score the image data with answers input thereto. With this configuration, the scoring support device 100 can support creation of questions designed for electronic terminals from a print medium used by a teacher or the like, scoring of answers of students for the questions, and management of scores.

The scoring support device 100 registers, in the correct answer table 151, the contents of input to the specified one or more answer areas or the contents of input corresponding to display of a certain question number of the one or more areas as a correct answer for the certain question number. With this configuration, the scoring support device 100 can determine whether answers input to the respective answer areas are correct, thereby performing scoring.

When receiving specification of the answer areas in the image data and specification of input of a plurality of correct answers, the scoring support device 100 stores the answer areas in the correct answer table 151 as an application target of the scoring rule that a score corresponding to the answer areas is given when all the specified input of correct answers is received and when no other input than the input of correct answers is received. With this configuration, if all the answer areas receive input of correct answers, but an area other than the answer areas receives input of a punctuation mark, the scoring support device 100 can determine that the answers are incorrect as a whole.

The scoring support device 100 uses scanned image data, thereby facilitating its creation of questions designed for electronic terminals from a print medium used by a teacher or the like.

[b] Second Embodiment

Figures 9, 10:
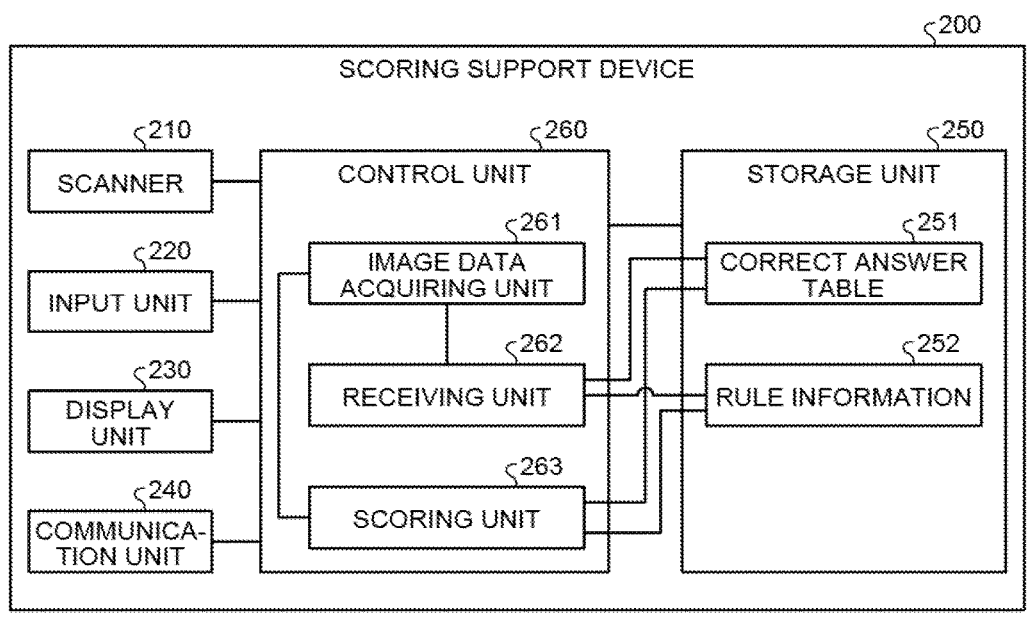
FIG. 9 is a functional block diagram of a configuration of the scoring support device according to a second embodiment of the present invention.
FIG. 10 is an example diagram of a data structure of the correct answer table according to the second embodiment.

FIG. 9 is a functional block diagram of a configuration of a scoring support device according to a second embodiment of the present invention. As illustrated in FIG. 9, a scoring support device 200 includes a scanner 210, an input unit 220, a display unit 230, a communication unit 240, a storage unit 250, and a control unit 260. The scoring support device 200 is an example of the correct/incorrect determination rule setting device.

Description of the scanner 210, the input unit 220, the display unit 230, and the communication unit 240 illustrated in FIG. 9 is the same as that of the scanner 110, the input unit 120, the display unit 130, and the communication unit 140 illustrated in FIG. 1.

The storage unit 250 stores therein a correct answer table 251 and scoring rule information 252. The storage unit 250, for example, corresponds to a semiconductor memory device, such as a RAM, a ROM, and a flash memory, or a storage device, such as an HDD.

FIG. 10 is an example diagram of a data structure of the correct answer table according to the second embodiment. As illustrated in FIG. 10, the correct answer table 251 stores therein a question number, a question area, and a correct answer area in a manner associated with one another. The question number is information for uniquely identifying a question. The question area indicates an area on an image data in which a question corresponding to the question number is present. The question area is specified by coordinates of its upper left corner and coordinates of its lower right corner, for example.

The correct answer area indicates an area in which a line surrounding a correct answer is written in a multiple-choice question including a correct answer and incorrect answers. The correct answer area is specified by coordinates of its upper left corner and coordinates of its lower right corner, for example.

The scoring rule information 252 defines conditions on which an answer for a question is determined to be correct. The scoring rule information 252, for example, includes the information that, if the center or the center of gravity of the surrounding line input by the user is included in the correct answer area, the answer for the question corresponding to the question number is determined to be correct. The scoring rule information 252 also includes the information that, if the center or the center of gravity of the surrounding line input by the user in the question area is not included in the correct answer area, the answer for the question corresponding to the question number is determined to be incorrect.

The control unit 260 includes an image data acquiring unit 261, a receiving unit 262, and a scoring unit 263. The control unit 260 corresponds to an integrated device, such as an ASIC and an FPGA. The control unit 260, for example, corresponds to an electronic circuit, such as a CPU and an MPU.

The image data acquiring unit 261 is a processing unit that acquires image data from the scanner 210. The image data acquiring unit 261 outputs the image data to the receiving unit 262 or the scoring unit 263. If the image data acquiring unit 261 acquires image data of a question sheet with no answer having been input thereto, for example, the image data acquiring unit 261 outputs it to the receiving unit 262. If the image data acquiring unit 261 acquires image data of a question sheet with answers input thereto, the image data acquiring unit 261 outputs it to the scoring unit 263. The image data acquiring unit 261 may be notified of whether the image data is data with no answer having been input thereto or data with answers input thereto by the user operating the input unit 220.

The scoring support device 200 according to the second embodiment may read, with the scanner 210, print media on which answers are written by students to perform scoring. Alternatively, the scoring support device 200 may display image data of a question sheet on terminal devices of the respective students and cause them to input the answers to perform scoring.

The receiving unit 262 is a processing unit that receives and registers information on the question area and the correct answer area of each question in the correct answer table 251. When receiving the rule information 252, the receiving unit 262 registers the rule information 252 in the storage unit 250. FIG. 11 is an example diagram of image data with no answer for multiple-choice questions having been input thereto.

The following describes an example of processing performed by the receiving unit 262. The receiving unit 262, for example, displays image data 60 illustrated in FIG. 11 including a message such as that "specify the question area and the correct answer area" on the display unit 230. The receiving unit 262 may also display a "question area specification button", a "correct answer area specification button", a "shift-to-next-question button", and an "end button", for example.

FIG. 12 is a diagram for explaining processing performed by the receiving unit according to the second embodiment. The user, such as a teacher, operates the input unit 220 to specify a question area 80a and press a question area specification button 2a, for example. The receiving unit 262 generates a unique question number and registers the coordinates of the question area 80a in the correct answer table 251 in a manner associated with the generated question number.

After pressing the question area specification button 2a, the user operates the input unit 220 to specify a correct answer area 70a and press a correct answer area specification button 2b. The receiving unit 262 registers the coordinates of the correct answer area 70a in the correct answer table 251 in a manner associated with the corresponding question number.

After completing specification of the question area and the correct answer area for a certain question, the user presses a shift-to-next-question button 2c. The user thus starts specification of a question area and a correct answer area for the next question.

Subsequently, the user specifies a question area 80b and presses the question area specification button 2a. The receiving unit 262 generates a unique question number and registers the coordinates of the question area 80b in the correct answer table 251 in a manner associated with the generated question number.

After pressing the question area specification button 2a, the user operates the input unit 220 to specify a correct answer area 70b and press the correct answer area specification button 2b. The receiving unit 262 registers the coordinates of the correct answer area 70b in the correct answer table 251 in a manner associated with the corresponding question number.

After completing specification of the question area and the correct answer area for a certain question, the user presses the shift-to-next-question button 2c. The user thus starts specification of a question area and a correct answer area for the next question. By contrast, if the processing described above is completed for all the questions in the image data 60, the user presses an end button 2d. When the end button 2d is pressed, the receiving unit 262 finishes the processing for registering information in the correct answer table 251.

Referring back to FIG. 9, the scoring unit 263 is a processing unit that performs scoring based on the correct answer table 251 and the rule information 252 when receiving image data with answers input thereto. The scoring unit 263, for example, selects a question number in the correct answer table 251 and specifies a correct answer area corresponding to the selected question number. If the center or the center of gravity of the surrounding line input as an answer is positioned in the correct answer area, the scoring unit 263 gives a score for the corresponding question based on the rule information 252. By contrast, if the center or the center of gravity of the surrounding line input as an answer is not positioned in the correct answer area, the scoring unit 263 does not give the score for the corresponding question based on the rule information 252.

FIG. 13 is an example diagram of image data with answers for the multiple-choice questions input thereto. In the example illustrated in image data 90, surrounding lines 90a and 90b are input, for example. A student may input the surrounding lines by writing them on a print medium and causing the scanner 210 to read them or by inputting them, with the input device, to the terminal device that displays the image data of the question sheet.

The processing performed by the scoring unit 263 will be described. FIG. 14 is a diagram for explaining processing performed by the scoring unit according to the second embodiment. The following describes a case where the scoring unit 263 scores a question in the question area 80a of a question number "T201" in the correct answer table 251. The scoring unit 263, for example, compares the image data 60 with no answer having been input thereto with the image data 90 with answers input thereto. The scoring unit 263 thus extracts a surrounding line 90a included in the question area 80a.

The scoring unit 263 determines whether the center or the center of gravity of the surrounding line 90a is positioned in the correct answer area 70a. Because the center or the center of gravity of the surrounding line 90a in the example illustrated in FIG. 14 is positioned in the correct answer area 70a, the scoring unit 263 determines that the surrounding line 90a satisfies the condition of the rule information 252. In this case, the scoring unit 263 gives a score for the question corresponding to the question number "T201". The score for the question corresponding to the question number has been registered in the rule information 252, for example.

The following describes a case where the scoring unit 263 scores an answer for a question in the question area 80b of a question number "T202". The scoring unit 263, for example, compares the image data 60 with no answer having been input thereto with the image data 90 with answers input thereto. The scoring unit 263 thus extracts a surrounding line 90b included in the question area 80b.

The scoring unit 263 determines whether the center or the center of gravity of the surrounding line 90b is positioned in the correct answer area 70b. Because the center or the center of gravity of the surrounding line 90b in the example illustrated in FIG. 14 is not positioned in the correct answer area 70b, the scoring unit 263 determines that the surrounding line 90b does not satisfy the condition of the rule information 252. In this case, the scoring unit 263 does not give a score for the question corresponding to the question number "T202".

The scoring unit 263 performs the processing described above on the questions, thereby determining whether to give scores for the respective questions. The scoring unit 263 adds up the given scores, thereby calculating a score for the image data 90. The scoring unit 263 may display the calculated score on the display unit 230 or notify an external device of the score via the communication unit.

In a case where no surrounding line is input to the question area or where a plurality of surrounding lines are present even though a single item is supposed to be selected, which is not illustrated in FIG. 14, the scoring unit 263 does not give the score for the question.

The following describes a process of registration for scanning a question sheet with no answer having been written thereon and registering various types of information in the correct answer table 251 performed by the scoring support device 200 according to the second embodiment. FIG. 15 is a flowchart of a process of registration according to the second embodiment. As illustrated in FIG. 15, the image data acquiring unit 261 of the scoring support device 200 scans a question sheet with no answer having been written thereon to acquire image data (Step S301).

The receiving unit 262 of the scouring support device 200 displays the image data on the display unit 230 (Step S302). The receiving unit 262 receives specification of a question area and a correct answer area (Step S303). The receiving unit 262 registers a question number, the question area, and the correct answer area in the correct answer table 251 in a manner associated with one another (Step S304).

If the registration is not to be finished (No at Step S305), the receiving unit 262 performs the processing at Step S302 again. By contrast, if the registration is to be finished (Yes at Step S305), the receiving unit 262 finishes the processing.

Figure 16:
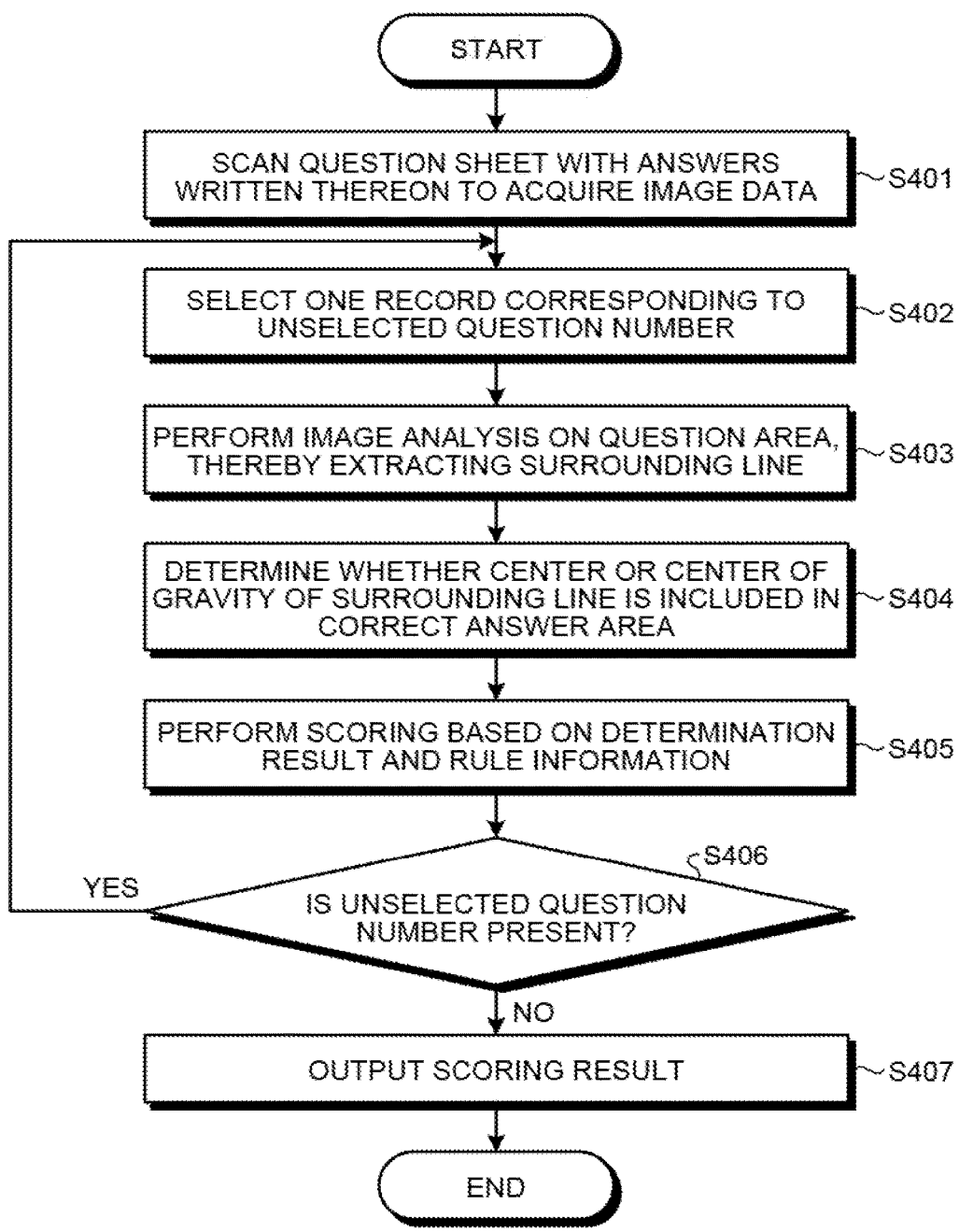
FIG. 16 is a flowchart of a process of scoring according to the second embodiment.

The following describes a process of scoring for scanning and scoring a question sheet with answers written thereon performed by the scoring support device 200 according to the second embodiment. FIG. 16 is a flowchart of a process of scoring according to the second embodiment. As illustrated in FIG. 16, the image data acquiring unit 261 of the scoring support device 200 scans a question sheet with answers written thereon to acquire image data with the answers input thereto (Step S401). The scoring support device 200 may display image data with no answer written thereon on the display unit 230 to receive input of answers to the displayed image data.

The scoring unit 263 of the scoring support device 200 refers to the correct answer table 251 to select one record corresponding to an unselected question number (Step S402). The scoring unit 263 performs an image analysis on the question area, thereby extracting a surrounding line (Step S403). The scoring unit 263 determines whether the center or the center of gravity of the surrounding line is included in the correct answer area (Step S404).

The scoring unit 263 performs scoring based on the determination result and the rule information 252 (Step S405). If the center or the center of gravity of the input surrounding line is positioned in the correct answer area, for example, the scoring unit 263 gives a score for the question.

If an unselected question number is present (Yes at Step S406), the scoring unit 263 performs the processing at Step S402 again. By contrast, if no unselected question number is present (No at Step S406), the scoring unit 263 outputs a scoring result (Step S407).

The following describes advantages effects of the scoring support device 200 according to the second embodiment. When receiving specification of a correct answer area corresponding to a correct answer while displaying a question sentence instructing students to draw a line surrounding the correct answer, the scoring support device 200 stores, in the storage unit 250, the rule information that the answer for the question sentence is determined to be correct if the center or the center of gravity of the input surrounding line is positioned in the correct answer area. By using the rule information, for example, the scoring support device 200 can score the image data with answers input thereto. With this configuration, the scoring support device 200 can support creation of questions designed for electronic: terminals from a print medium used by a teacher or the like, scoring of answers of students for the questions, and management of scores.

The following describes an example of a computer that executes an application target specification program or a correct/incorrect determination rule setting program that provides functions similar to those of the scoring support devices 100 and 200 according to the embodiments above. FIG. 17 is an example diagram of a computer that executes the application target specification program or the correct/incorrect determination rule setting program.

As illustrated in FIG. 17, a computer 300 includes a CPU 301, an input device 302, and a display 303. The CPU 301 performs various types of arithmetic processing. The input device 302 receives input of data from the user. The computer 300 also includes a reading device 304, an interface device 305, and a scanner 306. The reading device 304 reads a computer program or the like from a storage medium. The interface device 305 transmits and receives data to and from another computer via a network. The computer 300 also includes a RAM 307 and a hard disk device 308. The RAM 307 temporarily stores therein various types of information. The devices 301 to 308 are connected to a bus 309.

The hard disk device 308 reads and loads a reception program 308a and a scoring program 308b to the RAM 307. The reception program 308a functions as a reception process 307a. The scoring program 308b functions as a scoring process 307b. The reception process 307a, for example, corresponds to the receiving units 162 and 262. The scoring process 307b corresponds to the scoring units 163 and 263.

The reception program 308a and the scoring program 308b are not always stored in the hard disk device 308 in advance. The programs, for example, may be stored in a "portable physical medium", such as a flexible disk (FD), a compact disc read only memory (CD-ROM), a digital versatile disc (DVD), a magneto-optical disc, and an integrated circuit (IC) card, inserted into the computer 300. In this case, the computer 300 reads and executes the reception program 308a and the scoring program 308b from the medium.

The present invention can support creation of questions designed for electronic terminals from those on a print medium, scoring of answers of students, and management of scores.

All examples and conditional language provided herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing a scoring rule application target specification program that causes a computer to execute a process comprising:

first receiving a first image from a scanner which retrieves a surface of a print medium with no answer;

second receiving specification of one or more first answer areas to input a period and a comma in the first image;

third receiving specification of one or more first question areas in the first image;

specifying coordinates of the first question areas;

specifying one or more second answer areas included in a second question area wherein the first answer areas include the second answer areas and the first question areas include the second question area;

fourth receiving the period and the comma corresponding to the second answer areas respectively, from an input device;

storing question numbers, the second question area, the second answer areas and the period and the comma in an answer table respectively;

fifth receiving a second image from the scanner which retrieves a surface of a second print medium having a period and a comma;

identifying the period and the comma included in areas corresponding to the second answer areas in the second image; and determining whether the period or the comma in the second image are corresponding to the period or the comma in the answer table respectively.

2. The non-transitory computer-readable recording medium according to claim 1, wherein the storing stores contents of input to the specified one or more second answer areas or contents of input corresponding to display of a certain question number of the one or more second answer areas as the answer contents.

3. The non-transitory computer-readable recording medium according to claim 1, wherein the storing stores, in the answer table, when receiving specification of a specific area in the first image and specification of input of a plurality of correct answers, the specific area as an application target of a scoring rule that a score corresponding to the specific area is given when all the specified input of correct answers is received and when no other input than the input of correct answers is received.

4. A scoring rule application target specification method comprising:

first receiving a first image from a scanner which retrieves a surface of a print medium with no answer, by a processor;

second receiving specification of one or more first answer areas to input a period and a comma in the first image, by the processor;
third receiving specification of one or more first question areas in the first image, by the processor;
specifying coordinates of the first question areas, by the processor;
specifying one or more second answer areas included in a second question area wherein the first answer areas include the second answer areas and the first question areas include the second question area, by the processor;
fourth receiving the period and the comma corresponding to the second answer areas respectively, from an input device, by the processor;
storing question numbers, the second question area, the second answer areas and the period and the comma in an answer table respectively, by the processor;
fifth receiving a second image from the scanner which retrieves a surface of a second print medium having a period and a comma, by the processor;
identifying the period and the comma included in areas corresponding to the second answer areas in the second image, by the processor; and
determining whether the period or the comma in the second image are corresponding to the period or the comma in the answer table respectively, by the processor.

5. The scoring rule application target specification method according to claim 4, wherein the storing stores contents of input to the specified one or more second answer areas or contents of input corresponding to display of a certain question number of the one or more second answer areas as the answer contents, by the processor.

6. The scoring rule application target specification method according to claim 4, wherein the storing stores in the answer table, when receiving specification of a specific area in the first image and specification of input of a plurality of correct answers, the specific area as an application target of a scoring rule that a score corresponding to the specific area is given when all the specified input of correct answers is received and when no other input than the input of correct answers is received, by the processor.

7. An application target specifying device comprising:
a processor that executes a process including:
first receiving a first image from a scanner which retrieves a surface of a print medium with no answer;
second receiving specification of one or more first answer areas to input a period and a comma in the first image;
third receiving specification of one or more second first question areas in the specified one or more first areas in the first image;
specifying coordinates of the first question areas;
specifying one or more second answer areas included in a second question area wherein the first answer areas include the second answer areas and the first question areas include the second question area;
fourth receiving answer contents the period and the comma corresponding to the specified one or more second answer areas respectively, from an input device;
storing question numbers, the specified one or more first second question area, the specified second answer areas and the answer contents period and the comma in an answer table respectively;
fifth receiving a second image from the scanner which retrieves a surface of a second print medium having answer a period and a comma;
identifying input characters the period and the comma included in areas correspond to the second answer areas in the second image; and
determining whether the period or the comma in the second image are corresponding to the period or the comma in the answer table respectively.

8. The application target specifying device according to claim 7, wherein the storing stores contents of input to the specified one or more second answer areas or contents of input corresponding to display of a certain question number of the one or more second answer areas as the answer contents.

9. The application target specifying device according to claim 7, wherein the storing stores, in the answer table, when receiving specification of a specific area in the first image and specification of input of a plurality of correct answers, the specific area as an application target of a scoring rule that a score corresponding to the specific area is given when all the specified input of correct answers is received and when no other input than the input of correct answers is received.

* * * * *